UNITED STATES PATENT OFFICE.

JOHN FLEMING WHITE, OF BUFFALO, NEW YORK.

PROCESS OF MAKING SODA ALUM.

SPECIFICATION forming part of Letters Patent No. 714,846, dated December 2, 1902.

Application filed February 23, 1899. Renewed May 2, 1902. Serial No. 105,695. (No specimens.)

*To all whom it may concern:*

Be it known that I, JOHN FLEMING WHITE, a citizen of the United States, residing at Buffalo, in the county of Erie and State of New York, have invented new and useful Improvements in Methods of Manufacturing Soda Alum from Niter-Cake, of which the following is a specification.

This invention relates to the manufacture of soda alum, which is the double salt, consisting of sodium sulfate and aluminium sulfate, and has the object to produce this salt by a simple, inexpensive, and satisfactory method.

In practicing this invention I utilize niter-cake, which is a waste or by-product resulting from the action of sulfuric acid upon sodium nitrate in the manufacture of nitric acid. This niter-cake consists of about fifty per cent. of sodium sulfate, thirty-three per cent. of free sulfuric acid, ($H_2SO_4$,) and seventeen per cent. of water, sand, and other impurities. This niter-cake is dissolved in a lead-lined tank in a sufficient quantity of water to form a solution having a density of about 35° Baumé. I then add to this solution a clay or clay-like material which is rich in free alumina or hydrate of alumina—for instance, bauxite or alenite—until the acid is fully neutralized. For example, a charge of five thousand pounds of niter-cake requires about eighteen hundred pounds of bauxite or other mineral containing a similar percentage of free alumina or hydate of alumina. The sulfuric acid combines with the alumina to aluminium sulfate, $Al_2O_3(SO_3)_3$. The proportion of aluminium sulfate in the solution is, however, less than that which is required for the formation of soda alum, which contains in the calcined state about seventy-one parts, by weight, of aluminium sulfate and twenty-nine parts of sodium sulfate. In order to increase the proportion of aluminium sulfate in the solution to that which is required for the formation of soda alum, I add a sufficient quantity of a watery solution of aluminium sulfate made in any suitable manner—for instance, by treating aluminium hydrate with sulfuric acid. The quantity of the aluminium sulfate which is required to be added is determined by ascertaining by proper tests the proportion of sodium sulfate and free sulfuric acid contained in the niter-cake which is employed and in which the proportion may vary somewhat in different batches. The aluminium-sulfate solution which is added should be equivalent to about four thousand five hundred and eighty pounds of dry aluminium sulfate. Instead of forming the solution of aluminium sulfate separately and adding it to the mixture, the ingredients for forming the aluminium sulfate—that is to say, the clay and sulfuric acid—may be added in the proper proportion directly to the mixture. This requires about three thousand six hundred pounds of bauxite or similar mineral and about nine thousand seven hundred and twenty pounds of sulfuric acid of 50° Baumé (62.5 per cent. $H_2SO_4$) or its equivalent in such acid of different strength. The ingredients are now thoroughly mixed, preferably heated to near the boiling-point, and then diluted with water or with wash-water from a previously-treated batch of material until the density of the solution is from 25° to 30° Baumé. The solution is then allowed to stand until the insoluble matters—such as silica, undissolved clay, or aluminium hydrate—have settled to the bottom. The clear liquor is then drawn off and enough sodium nitrate, nitric acid, or other oxidizing agent added to completely oxidize the very small amount of iron compounds which are contained in the solution. Iron compounds in the ferrous state discolor the salt during calcination and render the product unsalable, while iron compounds in the ferric state produce no discoloration.

When the percentage of iron compounds in the solution is such that it is desirable to remove the same, they are readily removed by adding an excess of clay until about one per cent. of the total aluminium oxid ($Al_2O_3$) is in the form of the basic aluminium sulfate. Enough sulfate of potash is then added to precipitate this basic aluminium sulfate as a basic alum. The iron is precipitated with this alum, and the clear liquor is afterward removed. The liquor is then concentrated in a lead-lined tank to a syrupy consistency—about 56° Baumé, specific gravity 1.635—and is then run upon a stone floor or other suitable receiver and allowed to cool and harden, when it forms an amorphous mass or cake. The composition of this cake is about as follows: sodium sulfate, ($Na_2SO_4$,) 15.48 per cent.; aluminium sulfate, $Al_2O_3(SO_3)_3$, 37.40 per cent.; water, traces of iron, or other compounds, 47.12 per cent. This cake is then calcined in a suitable furnace, ground, and bolted in the usual manner. The calcined alum consists about of sodium sulfate twenty-nine parts and aluminium sulfate seventy-one parts. Calcined-soda alum is in this manner produced at comparatively small expense and is suitable for use in baking-powder, where the much higher priced ammonia alum and potash alum is usually employed.

I claim as my invention—

The method of producing soda alum which consists in dissolving in water niter-cake, which is composed mainly of sodium sulfate and free sulfuric acid, introducing into the solution alumina which combines with the sulfuric acid to aluminium sulfate, adding the additional quantity of aluminium sulfate required for the formation of the double salt, boiling the solution to a syrupy consistency, allowing the same to cool and harden to an amorphous mass or cake, and then calcining and finishing the product, substantially as set forth.

Witness my hand this 22d day of February, 1899.

JOHN FLEMING WHITE.

Witnesses:
EDWARD WILHELM,
ELLA R. DEAN.